United States Patent
Manoharan et al.

(10) Patent No.: US 11,847,402 B2
(45) Date of Patent: Dec. 19, 2023

(54) SYSTEMS AND METHODS FOR LAYOUT CUSTOMIZATION

(71) Applicant: Walmart Apollo, LLC, Bentonville, AR (US)

(72) Inventors: Shirpaa Manoharan, Sunnyvale, CA (US); Vimitha Manohar, Sunnyvale, CA (US); Kannan Achan, Saratoga, CA (US); Veena Santhoshi Rajasekar, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/163,370

(22) Filed: Jan. 30, 2021

(65) Prior Publication Data
US 2022/0245323 A1    Aug. 4, 2022

(51) Int. Cl.
*G06F 40/106*    (2020.01)
*G06F 9/451*    (2018.01)
*G06N 3/08*    (2023.01)

(52) U.S. Cl.
CPC ............ *G06F 40/106* (2020.01); *G06F 9/451* (2018.02); *G06N 3/08* (2013.01)

(58) Field of Classification Search
CPC .......... G06F 40/106; G06F 9/451; G06N 3/08
See application file for complete search history.

(56) References Cited

U.S. PATENT DOCUMENTS

| | | | |
|---|---|---|---|
| 7,342,587 B2 | 3/2008 | Danzig et al. | |
| 7,778,889 B2 | 8/2010 | Bell et al. | |
| 8,307,278 B1* | 11/2012 | Spear | G06F 16/9577 715/240 |
| 10,922,372 B1* | 2/2021 | Bailey | G06F 16/9577 |
| 2006/0085251 A1 | 4/2006 | Greene | |
| 2007/0079236 A1* | 4/2007 | Schrier | G06F 40/114 715/206 |
| 2013/0304607 A1* | 11/2013 | Costa | G06Q 30/0631 705/26.7 |
| 2014/0258849 A1 | 9/2014 | Chung et al. | |
| 2015/0074596 A1* | 3/2015 | Djabarov | G06F 3/0481 715/800 |
| 2018/0232345 A1* | 8/2018 | Mondal | G06F 40/106 |
| 2018/0260680 A1* | 9/2018 | Finkelstein | G10L 15/22 |
| 2019/0324825 A1* | 10/2019 | Schwartz | G06F 3/04842 |
| 2020/0019643 A1* | 1/2020 | Roy | G06F 40/30 |
| 2020/0320166 A1* | 10/2020 | Rouaix | G06F 3/04817 |
| 2021/0034225 A1* | 2/2021 | Harazi | G06F 3/04845 |
| 2021/0157975 A1* | 5/2021 | Gelosi | G06F 40/177 |
| 2021/0158423 A1* | 5/2021 | Ngo | G06N 20/00 |

* cited by examiner

*Primary Examiner* — Kyle R Stork
(74) *Attorney, Agent, or Firm* — Morgan, Lewis & Bockius LLP; Manita Rawat

(57) ABSTRACT

Systems and methods for customizing an interface are disclosed. Interaction data is received for at least one interaction with a network environment and an intent of the at least one interaction is identified based on the interaction data. A layout is selected for a user interface based on the identified intent. The layout includes at least one zone. The at least one zone of the layout is populated with one or more modules and the each of the one or more modules is populated with content based on the identified intent

20 Claims, 9 Drawing Sheets

SYSTEMS AND METHODS FOR LAYOUT CUSTOMIZATION

TECHNICAL FIELD

This application relates generally to interactive network environments and, more particularly, to user interfaces of interactive network environments.

BACKGROUND

Interactive network environments are configured to provide one or more functions to users of the environment. The interactive network environment may include a plurality of pages (or other user interface elements) to allow a user to interact with the environment. For example, an e-commerce interactive network environment may provide one or more pages configured to provide store functions, such as searching for goods, comparing goods, purchasing goods, etc.

Current interactive network environments present fixed layouts for each page in the environment. The layout and content of the page is predetermined at the time the page is generated by a developer. Although such content may be applicable to a user at some point in time, current interactive network environments are not able to alter pages to account for different customer intents when interacting with the environment.

SUMMARY

In various embodiments, a system is disclosed. The system includes a non-transitory memory having instructions stored thereon and a processor configured to read the instructions. The processor is configured to receive interaction data for at least one interaction with a network environment and to identify an intent of the interaction based on the interaction data. The processor is also configured to select a layout for a user interface based on the identified intent, wherein the layout includes at least one zone. The processor is configured to populate the zone of the layout with one or more modules and further configured to populate each of the modules with content based on the identified intent.

In various embodiments, a non-transitory computer readable medium having instructions stored thereon is disclosed. The instructions, when executed by a processor cause a device to perform operations including receiving interaction data for at least one interaction with a network environment and identifying an intent of the interaction based on the interaction data. The instructions, when executed by the processor cause the device to also perform selecting a layout for a user interface based on the identified intent, wherein the layout includes at least one zone. The instructions, when executed by the processor further cause the device to perform populating the zone of the layout with one or more modules and populating each of the modules with content based on the identified intent.

In various embodiments, a computer-implemented method is disclosed. The computer-implemented method includes the steps of receiving interaction data for at least one interaction with a network environment and identifying an intent of the at least one interaction based on the interaction data. The method also includes selecting a layout for a user interface based on the identified intent, wherein the layout includes at least one zone. The method further includes populating the zone of the layout with one or more modules and populating each of the modules with content based on the identified intent.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
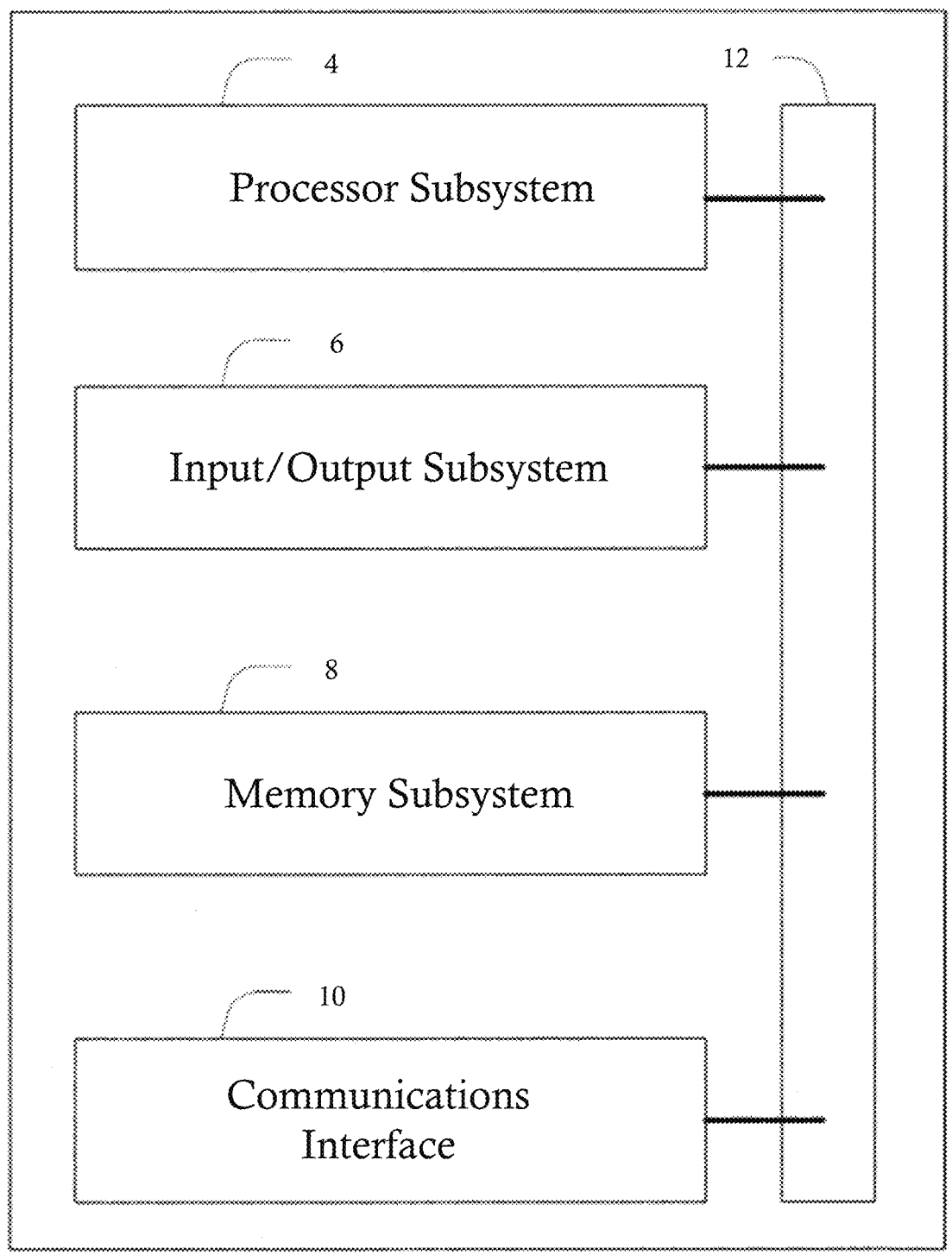
FIG. 1 illustrates a block diagram of a computer system, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In various embodiments, systems and methods of customizing an interface layout based on determined intent are disclosed. A user interacting with an interface, such as an interface provided by a network environment (e.g., an e-commerce environment), may have different intents, e.g., different purposes, for the interaction. For example, in the context of an e-commerce interface providing different categories of goods and/or services, a single user may interact with the e-commerce environment for a first purpose, such as grocery shopping, at a first time and interact with the e-commerce environment for a second purpose, such as furniture shopping, at a second time. The disclosed systems and methods are configured to determine the intent of the user for each interaction and customize the layout of the network environment based on the determined intent. Customization may include changing the layout of the interface, changing individual elements within the layout, and/or changing content presented by elements within the layout. Although embodiments are generally discussed herein in the context of an e-commerce network environment, it will be appreciated that the systems and methods disclosed herein may be applied to any suitable network environment configured to provide interactions based on multiple intents.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 modules may be combined or omitted such as, for example, not including an input/output subsystem 6. In some embodiments, the system 2 may comprise other modules not combined or comprised in those shown in FIG. 1. For example, the system 2 may also include, for example, a power subsystem. In other embodiments, the system 2 may include several instances of the modules shown in FIG. 1. For example, the system 2 may include multiple memory subsystems 8. For the sake of conciseness and clarity, and not limitation, one of each of the modules is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system modules including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Module Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or module to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or modules capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and modules, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and modules, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Module Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a module interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various modules of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including generation of customized interfaces based on a determined intent, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming In some embodiments a compiler or interpreter is comprised to convert the instruction set into machine executable code for execution by the processing subsystem 4.

Figure 2:
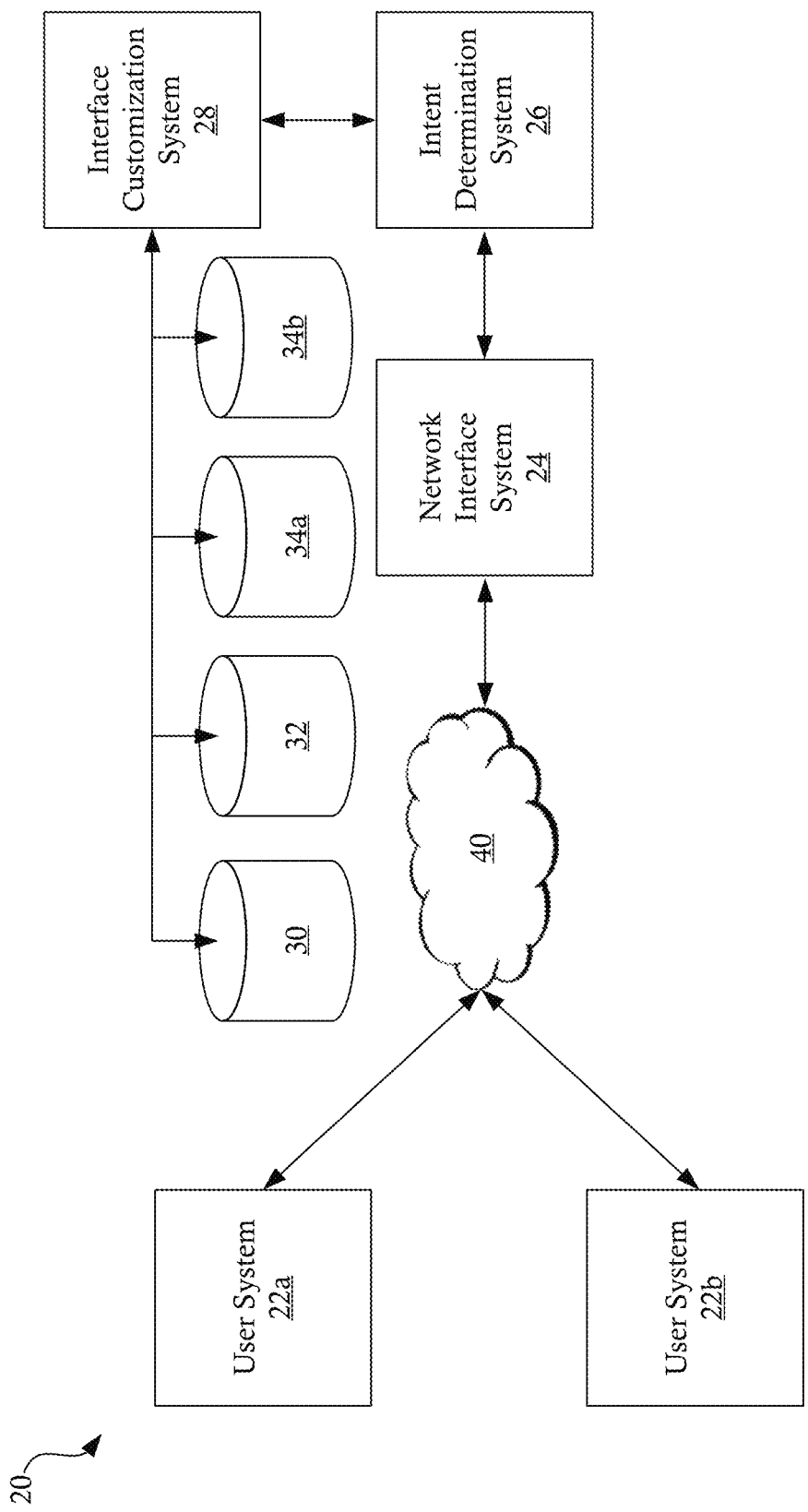
FIG. 2 illustrates a network environment configured to provide a customized interface including a customized layout based on a determined intent, in accordance with some embodiments.

FIG. 2 illustrates a network environment 20 configured to provide a customized interface including a customized layout based on a determined intent, in accordance with some embodiments. The network environment 20 may include, but is not limited to, one or more user systems 22a-22b, a network interface system 24, an intent determination system 26, an interface customization system 28, a layout database 30, a module database 32, and one or more module data sources 34a-34b. Each of the systems 22a-28 and/or the databases 30-34b may include a system as described above with respect to FIG. 1. Although embodiments are illustrated herein having discrete systems, it will be appreciated that one or more of the illustrated systems may be combined into a single system configured to implement the functionality and/or services of each of the combined systems. For example, although embodiments are illustrated and discussed herein including each of a network interface system 24, an intent determination system 26, an interface customization system 28, a layout database 30, a module database 32, and one or more module data sources 34a-34b, it will be appreciated that these systems may be combined into a single logical and/or physical system configured to perform the functions and/or provide services associated with each of the individual systems. It will also be appreciated that each of the illustrated systems may be replicated and/or split into multiple systems configured to perform similar functions and/or parts of a function.

In various embodiments, the user systems 22a-22b are configured to allow a remote user, such as a customer, to interact with the network environment 20, and specifically the network interface system 24. The user systems 22a-22b may include any suitable user system, such as, for example, a desktop, laptop, tablet, mobile device, virtual device, and/or any other suitable device configured to interact with the network interface system 24. In some embodiments, the user systems 22a-22b are capable of signal communication with the network interface system 24 via a network 40. Although the user systems 22a-22b are illustrated as being coupled to the network interface system 24 via network 40, it will be appreciated that any suitable data connection may be provided between the systems 24-34b illustrated in FIG. 2.

In various embodiments, the network interface system 24 is configured to provide an interactive network environment, such as, for example, an e-commerce environment. The network interface system 24 may include any suitable system configured to provide one or more interfaces of the network environment. For example, in embodiments including an e-commerce environment, the network interface system 24 may be configured to provide one or more e-commerce webpages or applications to a user via the user system 22a-22b. In some embodiments, and as discussed in greater detail below, the network interface system 24 provides a customized interface including a customized layout based on a determined intent of the user interacting with the network interface system 24.

In some embodiments, the network interface system 24 is in signal (e.g., data) communication with one or more additional systems configured to determine an intent and/or provide layout customization for the network environment. In some embodiments, the network interface system 24 is in signal communication with an intent determination system 26 configured to identify an intent of a user during an interaction with the network interface system 24. The intent determination system 26 may utilize historical activities and/or real-time activities to determine an intent. For example, and as discussed in greater detail below, the intent determination system 26 may be configured to use historical activities such as prior transactions, add-to-cart interactions, etc. and/or real-time in-session signals such as item views, add-to-cart interactions, searches, etc.

In some embodiments, the intent determination system 26 determines the intent of the interaction and provides the determined intent to one or more additional systems, such as the network interface system 24 and/or the interface customization system 28. In some embodiments, the interface customization system 28 is configured to customize at least one interface provided by the network interface system 24 based on the determined intent received from the intent determination system 26. For example, in some embodiments, the interface customization system 28 is configured to select one of a plurality of predetermined layouts for generation of the interface based on the determined intent. As another example, in some embodiments, the interface customization system 28 is configured to select one of a plurality of modules for insertion into predetermined locations in a layout and/or content for insertion into one or more modules in the layout.

In some embodiments, the interface customization system 28 is in signal (e.g., data) communication with one or more databases containing customized and/or customizable elements for an interface. For example, in various embodiments, the interface customization system 28 may be in communication with (and/or integrally formed with) one or more layout databases 30, module database 32, and/or content databases 34a-34b. The interface customization system 28 may be configured to select one of a plurality of layouts from the layout database 30, populate a layout (such as a layout selected from the layout database 30) with one or more modules selected from the module database 32, and/or populate one or more modules (such as modules selected from the module database 32 and/or included in the layout selected from the layout database 30) with content selected from one or more content sources, such as content databases 34a-34b.

Figure 3:
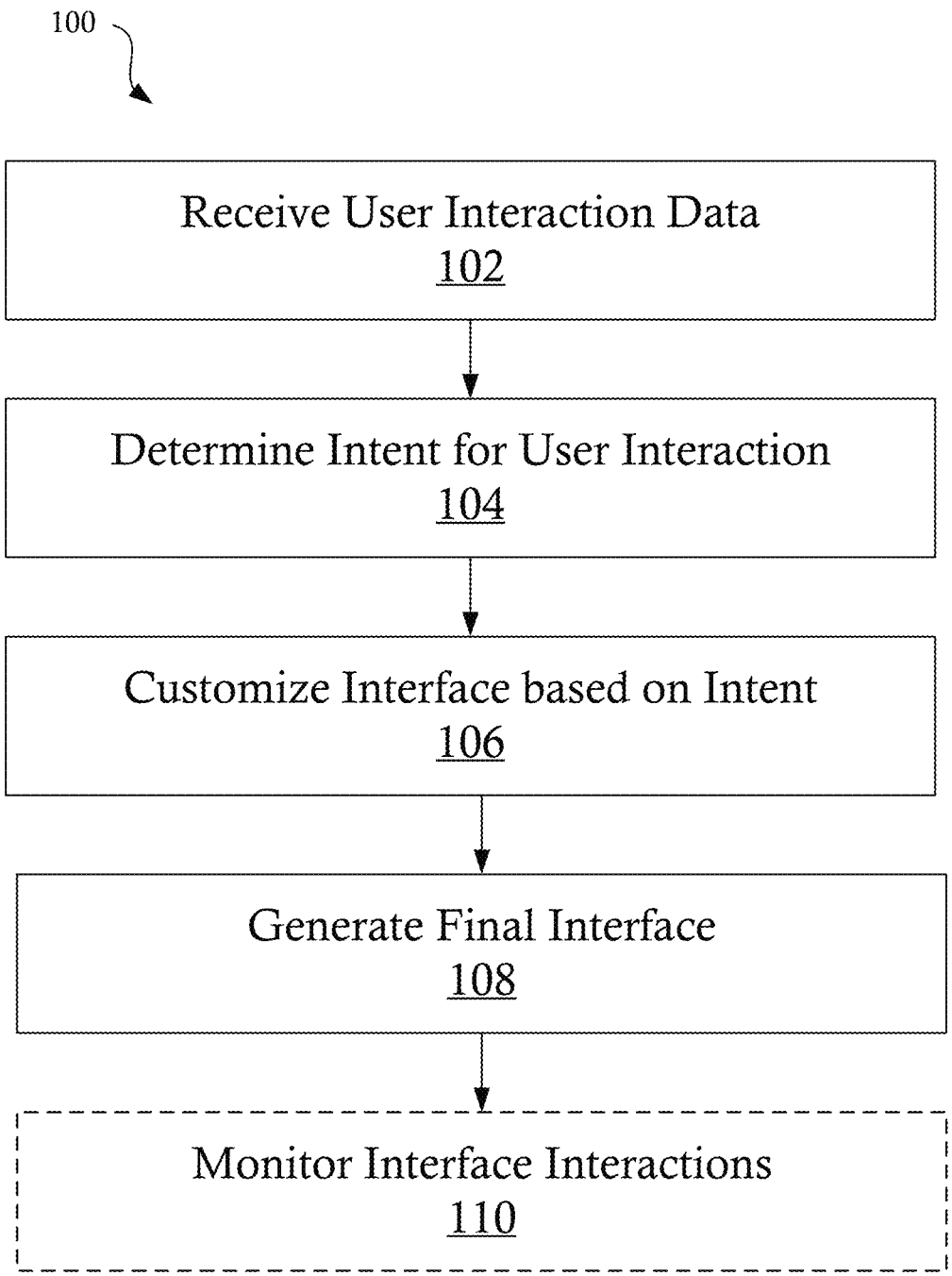
FIG. 3 is a flowchart illustrating a method of generating a customized user interface based on intent of a user, in accordance with some embodiments.
Figure 4:
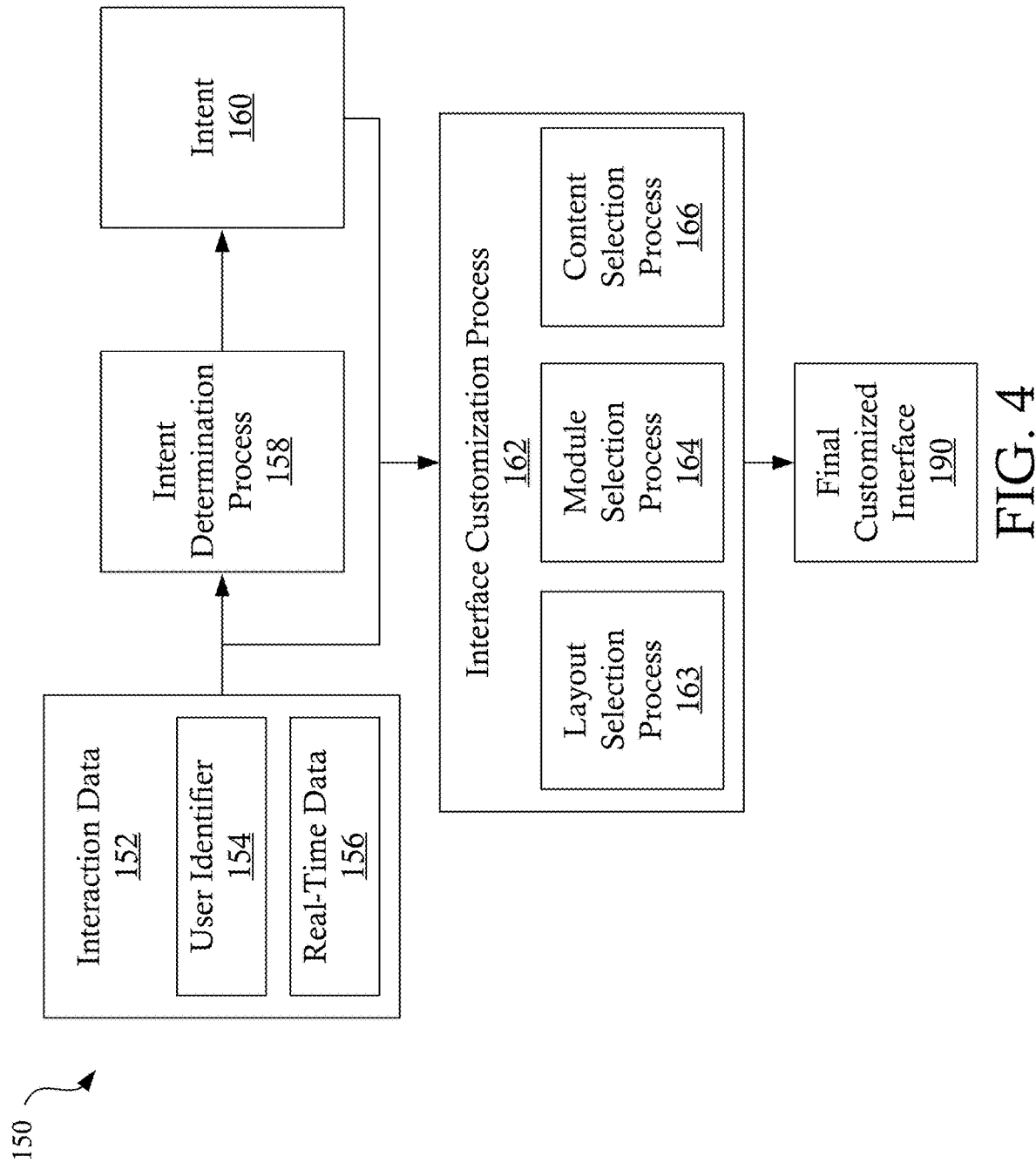
FIG. 4 is a process flow illustrating the method of generating a customized user interface of FIG. 3, in accordance with some embodiments.

FIG. 3 is a flowchart illustrating a method of 100 of generating a customized interface based on a determined intent, in accordance with some embodiments. FIG. 4 is a process flow 150 illustrating various steps of the method 100 of generating a customized interface illustrated in FIG. 3, in accordance with some embodiments. In some embodiments, the method 100 is configured to customize a user interface based on user context, including, but not limited to, user historical interactions, user journey/experience, and current user interactions.

At step 102, a system, such as the network interface system 24, receives a user interaction with a network interface provided by the system. The user interaction includes transmission of interaction data 152, such as, for example, a user identifier 154, real-time interaction data 156, and/or other interaction information.

At step 104, an intent 160 for the user interaction is determined. The intent 160 may be determined based on historical interaction information and/or real-time interaction information. For example, in some embodiments, an intent determination process 158 is based on the user information 152 received as part of the user interaction. The intent determination process 158 may obtain historical interaction data based on the user identifier 154 and/or use the real-time interaction data 156. The historical interaction data may be stored, for example, in one or more databases 36 in communication with the system configured to implement the intent determination process 158, such as the intent determination system 26.

In some embodiments, the intent determination process 158 implements a trained intent determination model. The trained intent determination model includes a trained machine-learning model configured using a training data set to identify an intent of an interaction. In some embodiments, the trained intent determination model includes a recurrent neural network (RNN), although it will be appreciated that any suitable machine-learning model may be used.

In some embodiments, the intent determination process 158 may use temporal contextual information to identify an intent 160 of a user interacting with the network interface. For example, in some embodiments the network environment includes an e-commerce environment providing grocery products among other categories of products. If a user has historically purchased groceries at a once-a-week interval and the user's last interaction with the network environment was one week prior, the intent determination process 158 may identify a "grocery" intent 160 for the user.

Similarly, if a user with a historic once-a-week grocery interval purchased groceries within the last week (e.g., last purchase transaction including a grocery item was less than one week prior), the intent determination process 158 may identify an intent 160 other than a grocery intent.

As another example, in some embodiments, the network environment includes an e-commerce environment providing fashion and home furniture products among other categories of products. A user having historical interactions for fashion may interact with the network environment to search for a specific piece of home furniture. The intent determination process 158 identifies the search parameters and identifies the user intent 160 as a "furniture" intent. Although specific embodiments are discussed herein, it will be appreciated that any number of intents based on any one or more parameters may be identified by the intent determination process 158.

In some embodiments, the intent determination process 158 may fail to identify an intent 160. For example, in some embodiments, required information, such as a user identifier, may not be provided. In other embodiments, the user interactions and/or historical data may not conform to any of the intents included in the trained intent determination model. In such instances, the intent determination process 158 may generate a default intent indicating default interface elements are to be used. In some embodiments, default interface elements include wildcard elements, as discussed in greater detail below.

At step 106, the determined intent 160 is provided to an interface customization process 162 configured to generate a customized interface layout. The interface customization process 162 may be implemented by any suitable system, such as, for example, the interface customization system 28 discussed above. In some embodiments, the interface customization process 162 is configured to select at least one of a layout for the identified intent 160, one or more layout modules for the identified intent 160, and/or content for one or more modules based on the identified intent 160.

Figure 5:
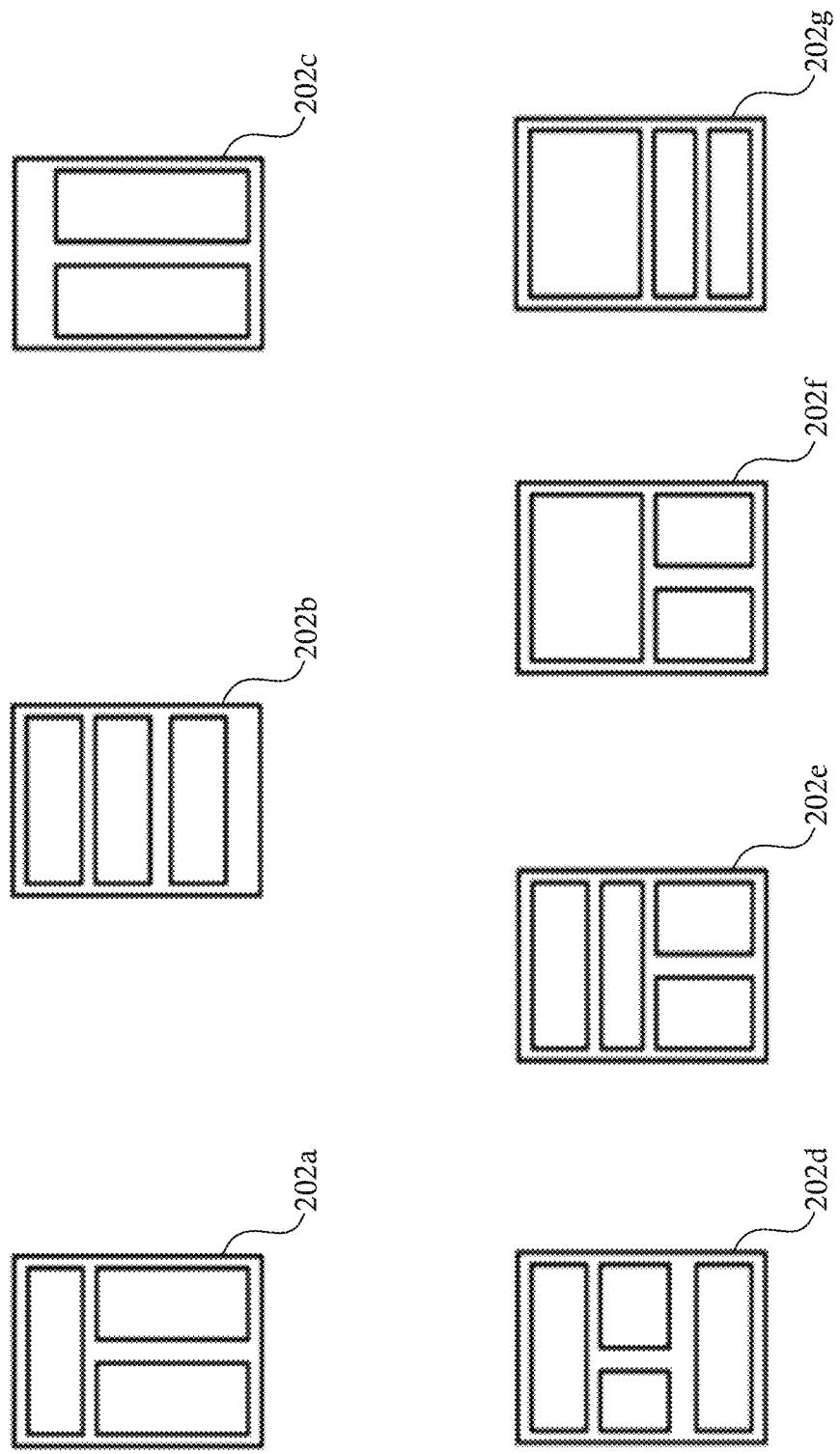
FIG. 5 illustrates a plurality of customized layouts configured to be selected for one or more pages in an interface, in accordance with some embodiments.

For example, in some embodiments, the interface customization process 162 includes a layout selection process 163 configured to select a layout from a plurality of layouts based on the identified intent 160. FIG. 5 illustrates a plurality of customized layouts 202a-202g that may be selected for one or more pages in an interface based on an identified intent 160 (or a default intent). Each of the customized layouts 202a-202g includes a plurality of zones 204 (also referred to as containers). Each of the zones 204 is configured to receive one or more interface modules therein. Interface modules may include, but are not limited to, fixed content, carousel modules, category carousel modules, customer engagement modules (with or without customer engagement tiles), input fields (e.g., search fields), reactive fields (e.g., search result fields), item carousels, spotlight modules, etc. Each module may be populated with content selected based on the intent 160, as described in greater detail below. For example, in some embodiments, if the intent 160 is identified as a "grocery" intent, a custom layout for a "grocery" intent may be loaded from a layout database 30 by the customization module 162 and populated with modules containing grocery content.

Although the customized layouts 202a-202g are illustrated having a set of zones 204 having predetermined sizes, it will be appreciated that the number of zones 204 defined on a customized layout 202a-202g and/or the parameters of a zone (e.g., size, location, etc.) may be modified based on modules selected for insertion into the layout, as discussed in greater detail below. In some embodiments, zones 204 are defined dynamically as modules are inserted into a layout 202a-202g such that a zone may be defined in any portion of a layout 202a-202g that can fit a selected module.

As discussed above, in some embodiments, the intent 160 may include a default intent. A default intent identify a default layout to be used and populated with default (or partially customized) modules, as discussed below. In addition, although embodiments are discussed herein including custom layouts based on user intent, it will be appreciated that, in some embodiments, one or more predetermined layouts may be used that are unrelated to the determined intent 160. For example, in some embodiments, a user interface may include a predetermined "home page" layout that is maintained across all intents. In such embodiments, a default layout may be loaded and populated with intent-specific modules and/or content, as discussed below with respect to steps 106-108. In some embodiments, the default layout may include default modules or content that are included in each instance of the default layout unrelated to the identified intent.

Figure 6:
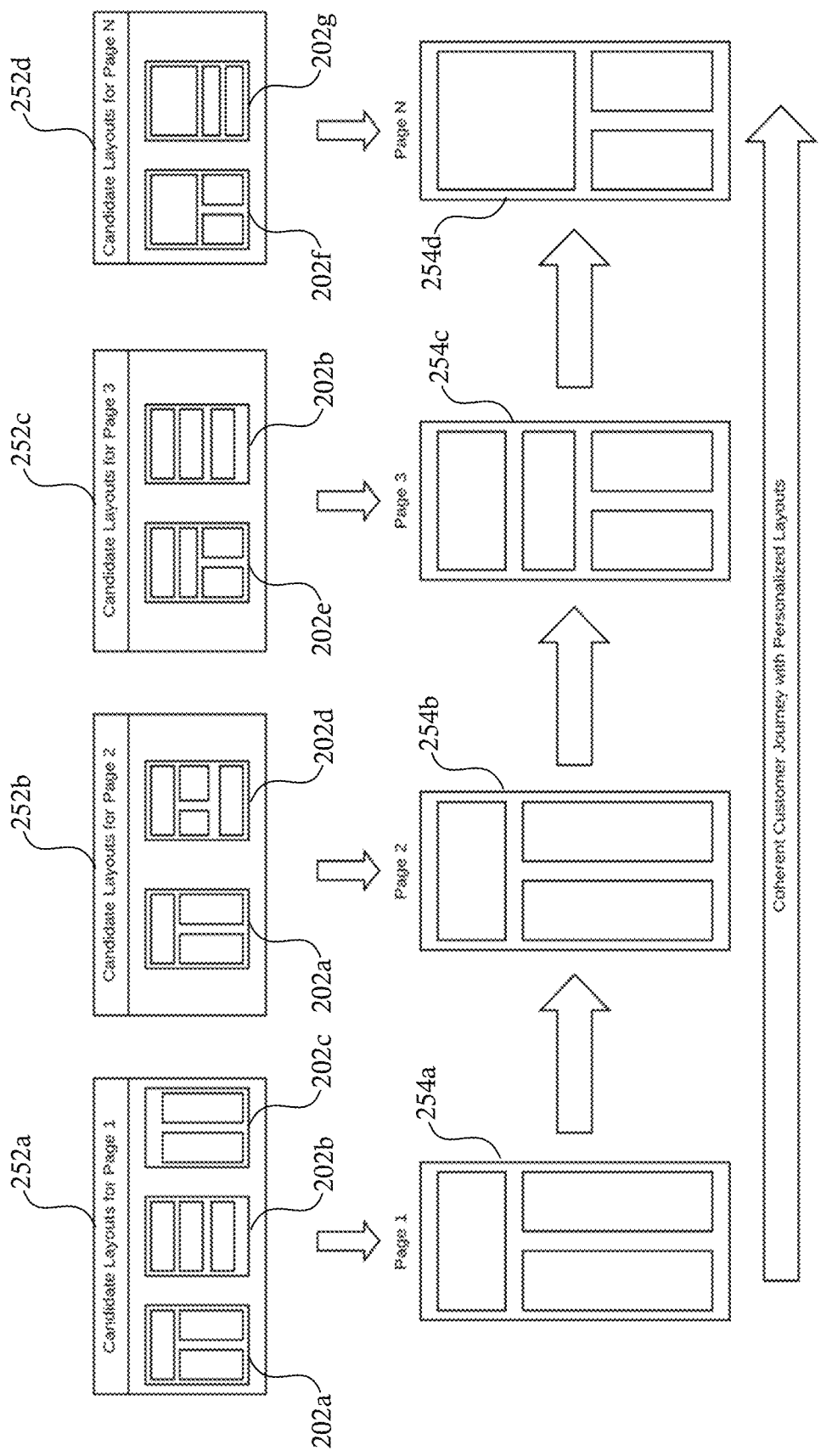
FIG. 6 illustrates sets of candidate layouts for pages in an interface, in accordance with some embodiments.

In some embodiments, different pages in an interface may include different custom layouts based on an intent 160. FIG. 6 illustrates sets 252a-252d of candidate layouts 202a-202g for pages in an interface, in accordance with some embodiments. For each page, one of the candidate layouts 202a-202g is selected and used to generate an interface page 254a-254d presented to a user during interaction with a network environment. In some embodiments, each of the interface pages 254a-254d may be generated using the same intent 160. In other embodiments, an intent 160 may be determined each time a user transitions between interface pages, at predetermined intervals, and/or based on any other suitable trigger.

In some embodiments, after selecting a layout 202a-202g and/or simultaneously with selecting a layout 202a-202g, the interface customization process 162 implements a module selection process 164 configured to select one or more modules for insertion into the selected layout 202a-202g. For example, in various embodiments, interface modules may include, but are not limited to, fixed content, carousel modules, category carousel modules, customer engagement modules (with or without customer engagement tiles), input fields (e.g., search fields), reactive fields (e.g., search result fields), item carousels, spotlight modules, etc. Modules may be selected to fit one or more predetermined zones 204 and/or may be inserted into dynamic zones 204 that are modified based on the selected module.

One or more modules for each zone 204 in a layout may be predetermined by layout 202a-202g and/or may be dynamically selected. For example, in some embodiments, a layout may specify a specific module type, such as a carousel module, be inserted into a specific zone 204 of the layout. If a module specified in a layout 202a-202g is unavailable, the interface customization process 162 may treat the specific zone 204 as a dynamic, or "wild-card," zone and populate the zone as discussed below.

In some embodiments, modules are selected for each zone 204 using a dynamic, or "wild-card," process that is configured to populate dynamic zones (e.g., zones without a specific module identified in the layout 202a-202g). For example, in some embodiments, modules may be selected for one or more zones 204 in a layout 202a-202g using a trained module selection network implemented by the module selection process 164. The trained module selection network may include any suitable trained machine learning network. In some embodiments, the trained module selection network includes a trained recurrent neural network (RNN) that is configured to select a set of best-fit modules (or components) for insertion into the module containers 204 of the selected layout 202a-202g. The RNN may include, for example, a sequence-to-sequence network.

Figure 7:
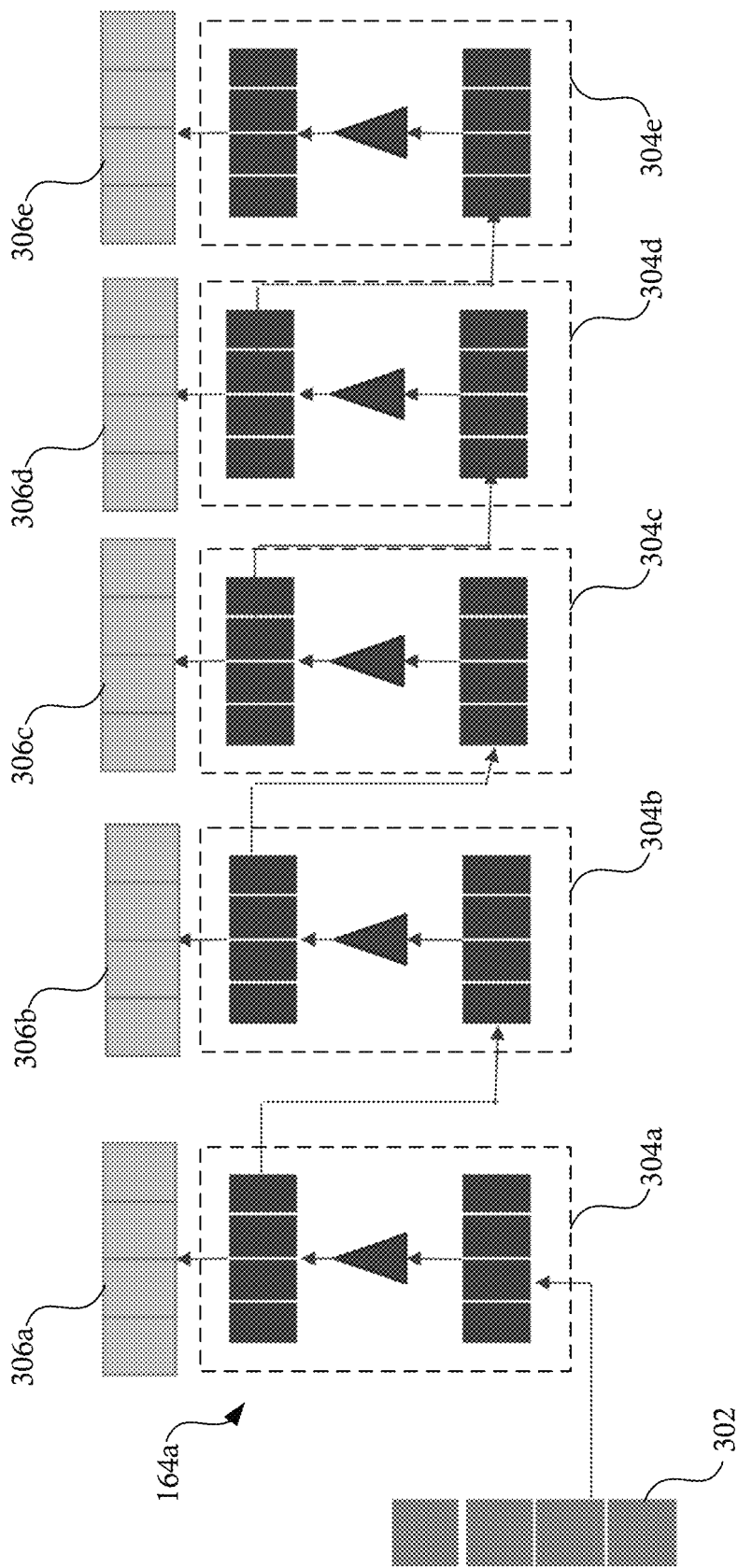
FIG. 7 illustrates a trained module selection network configured to dynamically select modules for insertion into a layout, in accordance with some embodiments.

As illustrated in FIG. 7, in some embodiments, a trained module selection network 164a may receive a set of input data 302 including, for example, a determined intent 160, historical customer data, active customer data, non-customer data (e.g., date information, inventory information, etc.), and/or any other suitable input information. In some embodiments, the trained module selection network 164a performs a first module selection block 302a (e.g., a first pass through the trained module selection network 164a) to select a first module 304b. The first module 306a is a first, best-fit module for insertion into a selected zone 204 of a selected layout 202a-202g.

The first module 306a is provided as an input to a second module selection block 304b (e.g., a second pass through the trained module selection network 164a) to select a second module 306b for insertion into the selected layout 202a-202g. The second module 306b includes the next, best-fit module for insertion into one of the previously selected zone and/or into a different zone in the layout. The trained module selection network 164a continues sequentially selecting a set of n next-best fit modules 304c-304e based on the prior module selection 304b-304d until a predetermined portion of a layout 202a-202g is filled. For example, in some embodiments, the trained module selection network 164a continues until all zones 204 in a layout 202a-202g have been filled. In other embodiments, the trained module selection network 164a continues until a single zone 204 is filled and separate instances of the trained module selection network 164a may be invoked for each zone 204 in a layout 202a-202g.

After selection of a module type (either as specified in a custom layout 202a-202g and/or according to a dynamic selection process), the modules are populated with content based, at least in part, on the identified intent 160, for example, by a content selection process 166. For example, in embodiments including a "grocery" intent, a custom layout 202a-202g may be selected that includes a carousel module configured to display a set of items available through an e-commerce interface. The set of items placed into (i.e., displayed within) the carousel module are selected, at least in part, on the identified grocery intent. Such items may include, but are not limited to, grocery items available from the e-commerce interface. In some embodiments, additional parameters, such as user historical data, product inventory data, sales data, promotional data, etc. may be used, in addition to the selected intent 160, to select content for filling a selected module. Selection of content may be based on categories of products associated with the intent 160 and/or a user, asset categories associated with the intent 160 and/or a user, and/or the current user context and user history. In some embodiments, if content is not available for a selected module, the module and/or zone including the module may be treated as a dynamic zone and processed according to the dynamic process described above.

In some embodiments, a specific module specified in the layout 202a-202g may not have suitable content associated therewith. For example, a specified module may not have content associated with an identified intent 160 and/or a default layout may have been selected by the layout selection process. In such instances, the interface customization process 162 may populate selected modules with default content. Default content may include, but is not limited to, curated (e.g., selected) assigned content for the specific module type. For example, if a carousel module is selected for the layout but the identified intent 160 does not have adequate associated content to fill the carousel module, the carousel module may instead be filled with default content.

In some embodiments, portions of a layout may be populated with partially-customized and/or default content. For example, if a default layout is selected, the default layout may include zones and/or modules configured to be populated with default content. The default content may be partially-customized based on a portion of information received during an interaction. For example, in some instances, while a user identifier may not be provided, other information such as a general user location, may be determined. The default layout may include customization directed at the determined information. For example, if a user location is determined, the default layout may include information related to the geographic area such as alerts of local natural hazards, status of store services in the geographic area, and/or other localized information pertinent to the user.

Although embodiments are discussed herein with a distinct layout selection process 163, module selection process 164, and content selection process 166, it will be appreciated that one or more of the customization processes 163, 164, 166 may be combined into a single customization process. For example, in some embodiments, selection of a custom layout 202a-202g and selection of modules for insertion into the custom layout may occur simultaneously and be inter-related. As modules are selected for insertion, the size and/or location of a zone in a layout may change, resulting in selection of a different custom layout 202a-202g and/or modification of a selected custom layout 202a-202g. In some embodiments, the module type determines dimensions of the module in a zone. In other embodiments, the zone determines the dimensions of a module inserted therein.

As another example, in some embodiments, the content of a module may be selected simultaneously with and be related to the selection of a module. For example, in some embodiments, a first intent may require a first module to be displayed at a first size to accommodate content related to the first intent and a second intent may require the first module to be displayed at a second size to accommodate content related to the second intent. As another example, in some embodiments, a first module may have a higher interaction rate for a first intent and a lower interaction rate for a second intent. If the first module is inserted into a custom layout based on a first intent, the size of the first module may be increased due to the higher interaction rate. Similarly, if the first module is inserted into a custom layout based on a second intent, the size of the first module may be decreased due to the lower interaction rate. It will be appreciated that the size, location, visual appearance, and/or other parameters of a layout zone, module, and/or content may be adjusted during generation of a custom interface in accordance with the methods disclosed herein.

With reference again to FIG. 3, at step 108, a final customized interface 190 is output by the interface customization process 162 and presented to a user via a system, such as the network interface system 24. A user may interact with the custom layout, for example using the user system 22a-22b. In some embodiments, if a new interface page is requested, the network interface system 24 is configured to return to step 104 to generate a new interface page for presentation in the user interface.

At optional step 110, the final customized interface 190 is monitored to determine one or more metrics associated with the interface. For example, in some embodiments, the network interface system 24 may monitor one or more metrics, such as click-through rates, add-to-cart rates, purchase rates, purchase amounts, conversion rates, repeat visit rates, and/or any other suitable metric associated with the network environment. The monitored metrics may be associated with the final customized interface 190 and/or portions of the final customized interface 190. For example, in some embodiments, the network interface system 24 may associate one or more metrics with a custom layout 202*a*-202*g* selected at step 106. As another example, in some embodiments, the network interface system 24 may associate one or more metrics with an intent 160 identified at step 104. It will be appreciated that any suitable metrics can be monitored for any portion of the user interface.

In some embodiments, the monitored metrics are provided as training data to a training process for training an intent determination model, as discussed in greater detail below. The monitored metrics may be used by a training (or re-training) process to identify best-fit modules having the highest customer interaction rates. In other embodiments, one or more custom layouts 202*a*-202*g* may be modified based on monitored metrics for the selected layouts 202*a*-202*g* to remove lower-performing modules and add higher-performing modules. It will be appreciated that the monitored metrics may be used by any suitable system for determinations regarding the user interface and/or portions thereof.

Figure 8:
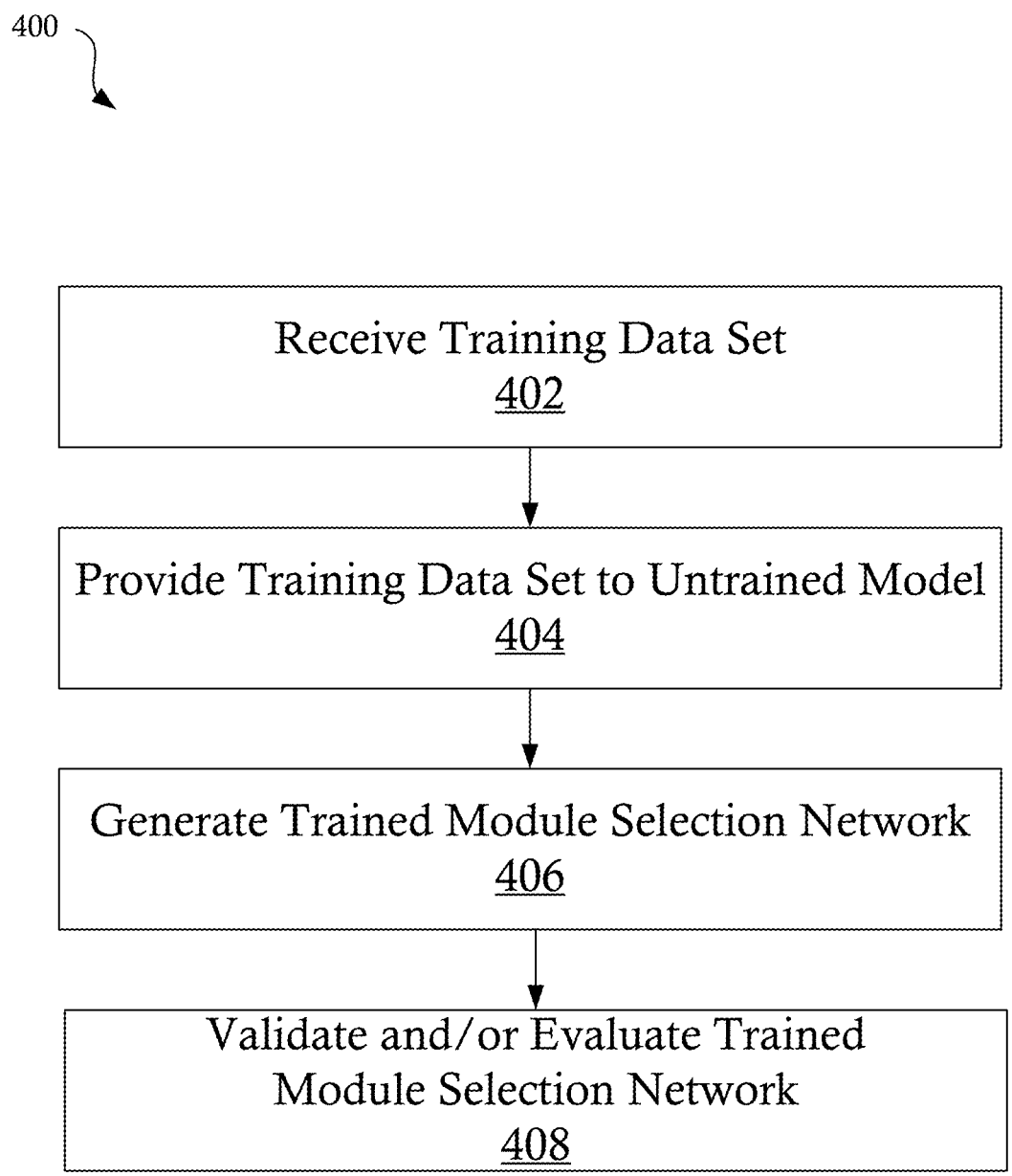
FIG. 8 is a flowchart illustrating a method of training a module selection network, in accordance with some embodiments.
Figure 9:
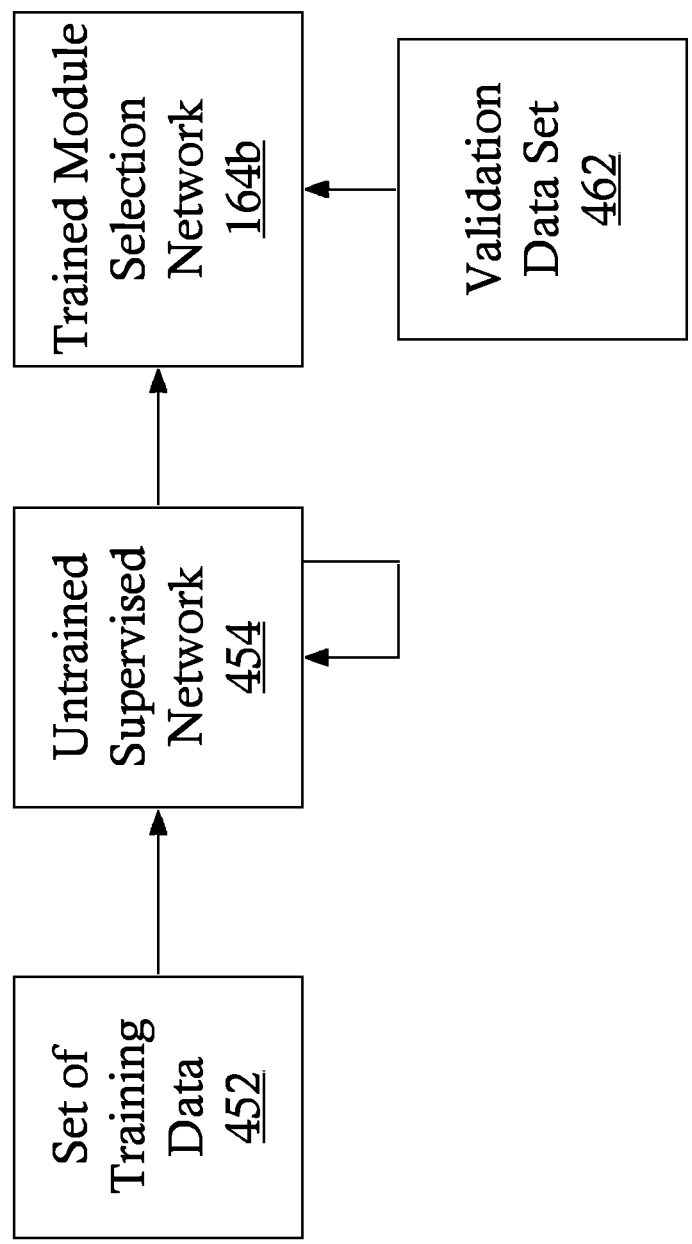
FIG. 9 is a process flow illustrating various steps of the method of training a module selection network illustrated in FIG. 8, in accordance with some embodiments.

FIG. 8 is a flowchart illustrating a method 400 of generating a trained intent determination model, in accordance with some embodiments. FIG. 9 is a process flow 450 illustrating various steps of the method 400 of generating a trained intent determination model illustrated in FIG. 8, in accordance with some embodiments. At step 402, a set of training data 452 is provided to an untrained supervised network. The set of training data 452 may include customer data (such as historic customer data, interaction data, preference data, etc.), layout data (including click-through, add-to-cart, purchase, and/or other data related to specific layouts), module data (including click-through, add-to-cart, purchase, and/or other data related to individual modules), promotional data, and/or any other suitable training data. The training data 452 may include labeled training data sets identifying specific customer, specific layouts, and specific outcomes.

In some embodiments, the untrained supervised network includes a recurrent neural network (RNN). An RNN is an artificial neural network that includes connections between nodes to form a directed graph along a temporal sequence. RNNs can use their internal state (memory) to process variable length sequences of inputs.

The term "recurrent neural network" may be used to refer to two classes of networks: finite impulse networks and infinite impulse networks. A finite impulse recurrent network is a directed acyclic graph that can be unrolled and replaced with a strictly feedforward neural network, while an infinite impulse recurrent network is a directed cyclic graph that cannot be unrolled. An RNN can have additional stored states and such storage may be under direct control of the RNN. In some embodiments, the storage can also be replaced by another network or graph that incorporates time delays or has feedback loops. Such controlled states are referred to as gated state or gated memory, and may be part of long short-term memory networks (LSTMs) and gated recurrent units. In some embodiments, the RNN includes a sequence-to-sequence network, although it will be appreciated that any suitable supervised network may be used.

At step 404, the untrained supervised network 454 is iteratively trained based on the training data 452 to identify a next-best module for insertion into a layout. The untrained supervised network 454 is trained to receive a predetermined set of inputs (as determined by the training data 452) and a prior selected module (e.g., a prior best-fit module) and determine the next-best fit module for the layout based on the user context (e.g., intent, historical data, etc.). The iterative training process may continue until one or more predetermined factors or met. For example, a predetermined number of iterative passes may be set for training the network. In other embodiments, an evaluation process may be applied to verify mapping of certain inputs to ideal, or predetermined, layouts and/or components. It will be appreciated that any suitable metrics may be used for controlling the number of iterative training processes applied. In some embodiments, a previously trained network may be used as an initial state of the untrained supervised network 454 and/or for evaluation of the untrained supervised network 454 during training.

At step 406, a trained module selection network 164*b* is output. The trained module selection network 164*b* is configured to select one or more modules for insertion into a layout according to the dynamic selection process described above. The trained module selection network 164*b* may be deployed to one or more systems, such as, for example, the interface customization system 26. In some embodiments, at optional step 408, the trained module selection network may be validated using a validation data set 462. The validation data set may include a set of data similar to the training data set 452 configured to verify selection of best-fit modules for a layout, in accordance with some embodiments.

Although embodiments are discussed herein including a trained module selection network 164-164*b*, it will be appreciated that the trained network may be configured to select one or more of a custom layout, modules for insertion into (or population of) the custom layout, and/or content for insertion into (or population of) the selected modules. In other embodiments, multiple trained networks may be configured to perform each step (or some combination thereof) in the interface customization process 162 and the output of one model may be provided as an input to a subsequent model in the interface customization process 162.

Although the subject matter has been described in terms of various embodiments, the claims should be construed broadly, to include other variants and embodiments, which may be made by those skilled in the art.

What is claimed is:

1. A system, comprising:
    a non-transitory memory having instructions stored thereon and at least one processor configured to read the instructions to:
        receive interaction data of a user for at least one interaction with a network environment;
        identify an intent of the user based on the interaction data and temporal contextual information;
        select a layout for a user interface presented to the user based on the identified intent of the user, wherein the layout includes a plurality of zones;
        populate each of the plurality of zones of the layout with one or more modules, wherein at least one of the plurality of zones is populated with a plurality of modules, wherein a first zone of the plurality of zones has a dynamic size determined based on the one or more modules selected for the first zone, wherein a size of the one or more modules selected for the first zone is determined at least in part based on the intent, wherein the one or more modules selected for a second zone in the plurality of zones are selected based on the one or more modules selected for the first zone, and wherein the one or more modules selected for the second zone are selected by a trained machine-learning model configured to select the one or more modules for the second zone based at least in part on the one or more modules selected for the first zone and the dynamic size of the first zone;

populate each of the one or more modules with content based on the identified intent; and modify a presentation-related parameter of the one or more modules in each of the plurality of zones of the layout based on an interaction rate of the user with respect to the one or more modules for the identified intent.

2. The system of claim 1, wherein the trained machine-learning model is configured to implement a dynamic module selection process.

3. The system of claim 2, wherein the trained machine-learning model comprises a recurrent neural network.

4. The system of claim 3, wherein the recurrent neural network is a sequence-to-sequence network configured to select a set of best-fit modules for insertion into each of the plurality of zones.

5. The system of claim 1, wherein the at least one processor is further configured to read the instructions to: update the intent of the user to select an updated layout, each time the user transitions between interface pages of the network environment or at predetermined time intervals.

6. The system of claim 1, wherein each of the plurality of zones specifies at least one predetermined module.

7. The system of claim 1, wherein the interaction data includes historic data for a customer associated with the at least one interaction, session data for the at least one interaction, or a combination thereof.

8. The system of claim 1, wherein the identified intent includes a default intent corresponding to a default layout.

9. The system of claim 1, wherein the trained machine-learning model comprises a first trained machine-learning model, and wherein the one or more modules selected for the first zone are selected by a second trained machine-learning model.

10. A non-transitory computer readable medium having instructions stored thereon, wherein the instructions, when executed by at least one processor cause a device to perform operations comprising:

receiving interaction data of a user for at least one interaction with a network environment;

identifying an intent of the user based on the interaction data and temporal contextual information;

selecting a layout for a user interface presented to the user based on the identified intent of the user, wherein the layout includes a plurality of zones;

populating each of the plurality of zones of the layout with one or more modules, wherein at least one of the plurality of zones is populated with a plurality of modules, wherein a first zone of the plurality of zones has a dynamic size determined based on the one or more modules selected for the first zone, wherein a size of the one or more modules selected for the first zone is determined at least in part based on the intent, wherein the one or more modules selected for a second zone in the plurality of zones are selected based on the one or more modules selected for the first zone, and wherein the one or more modules selected for the second zone are selected by a trained machine-learning model configured to select the one or more modules for the second zone based at least in part on the one or more modules selected for the first zone and the dynamic size of the first zone;

populating each of the one or more modules with content based on the identified intent; and modifying a presentation-related parameter of the one or more modules in each of the plurality of zones of the layout based on an interaction rate of the user with respect to the one or more modules for the identified intent.

11. The non-transitory computer readable medium of claim 10, wherein the trained machine-learning model is configured to implement a dynamic module selection process.

12. The non-transitory computer readable medium of claim 11, wherein the trained machine-learning model comprises a recurrent neural network.

13. The non-transitory computer readable medium of claim 12, wherein the recurrent neural network is configured to select a next-best fit module.

14. The non-transitory computer readable medium of claim 10, wherein each of the plurality of zones specifies at least one predetermined module.

15. The non-transitory computer readable medium of claim 10, wherein the interaction data includes historic data for a customer associated with the at least one interaction, session data for the at least one interaction, or a combination thereof.

16. The non-transitory computer readable medium of claim 10, wherein the identified intent includes a default intent corresponding to a default layout.

17. A method, comprising:

receiving interaction data of a user for at least one interaction with a network environment;

identifying an intent of the user based on the interaction data and temporal contextual information;

selecting a layout for a user interface presented to the user based on the identified intent of the user, wherein the layout includes a plurality of zones;

populating each of the plurality of zones of the layout with one or more modules, wherein at least one of the plurality of zones is populated with a plurality of modules, wherein a first zone of the plurality of zones has a dynamic size determined based on the one or more modules selected for the first zone, wherein a size of the one or more modules selected for the first zone is determined at least in part based on the intent, wherein the one or more modules selected for a second zone in the plurality of zones are selected based on the one or more modules selected for the first zone, and wherein the one or more modules selected for the second zone are selected by a trained machine-learning model configured to select the one or more modules for the second zone based at least in part on the one or more modules selected for the first zone and the dynamic size of the first zone;

populating each of the one or more modules with content based on the identified intent; and modifying a presentation-related parameter of the one or more modules in each of the plurality of zones of the layout based on an interaction rate of the user with respect to the one or more modules for the identified intent.

18. The method of claim 17, wherein the one or more modules are selected by a recurrent neural network configured to implement a dynamic module selection process comprising configured to select a next-best fit module.

19. The method of claim 17, wherein the interaction data includes historic data for a customer associated with the at least one interaction, session data for the at least one interaction, or a combination thereof.

20. The method of claim 17, wherein the identified intent includes a default intent corresponding to a default layout.

* * * * *